(No Model.)
W. BISHOP.
WATER CLOSET.
No. 289,210. Patented Nov. 27, 1883.
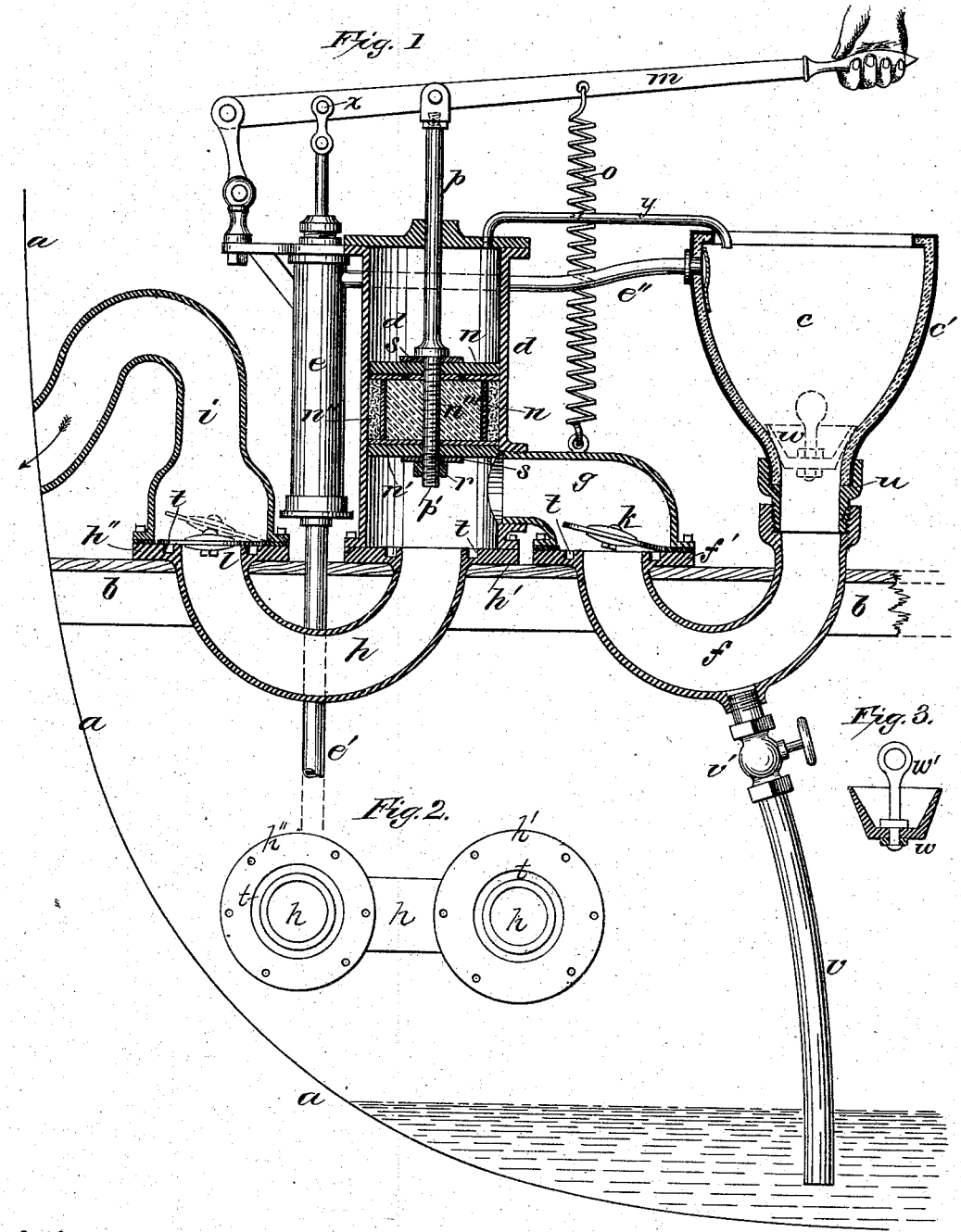
Witnesses:
Henry F. Parker.
Jno. Elkin.
Inventor:
William Bishop
by Chas. M. Higgins
Attorney.

UNITED STATES PATENT OFFICE.

WILLIAM BISHOP, OF BROOKLYN, NEW YORK.

WATER-CLOSET.

SPECIFICATION forming part of Letters Patent No. 289,210, dated November 27, 1883.

Application filed April 7, 1883. (No model.)

*To all whom it may concern:*

Be it known that I, WILLIAM BISHOP, of Brooklyn, Kings county, New York, have invented certain new and useful Improvements in Water-Closets, of which the following is a specification.

My invention applies to what are known as "ship" or "pump" closets adapted to be used on board ship, and in which the contents of the bowl are withdrawn by a pump connected therewith and thence forced into the sea, the movement of this soil-pump simultaneously operating a water-pump, whereby the sea-water is forced into the bowl to flush and wash the same. Such a closet is shown in a former patent issued to me, and my present invention is an improvement thereon.

The features of my present invention lie in an improvement in the construction of the valve-seats of the closet; also, in the special construction of the soil-piston, and in means to make it act more effectively as a valve to close the passages of the closet; also, in the manner of connecting the bowl with the trap, and in means whereby the soil-pump may serve as the ship's pump, to remove the bilge-water, which involve several novel features, as hereinafter fully set forth.

Figure 1 in the annexed drawings presents a general sectional elevation of my improved ship's closet. Fig. 2 is a plan view of one of the traps or limbs of the closet, and Fig. 3 represents a detail.

In Fig. 1 the line $a$ indicates the side or shell of the ship, and $b$ one of the decks or floors thereof on which the closet is shown erected.

$c$ indicates the bowl of the closet, $d$ representing the cylinder of the soil-pump, and $e$ the cylinder of the water-pump.

$f$ indicates the curved pipe or trap, which connects the neck of the bowl with the side of the soil-pump through a valve-chamber, $g$.

$h$ indicates a second curved pipe or trap which connects the soil-pump with the inverted trap or siphon pipe $i$, which opens into the sea through the ship's side, as shown. A check-valve, $k$, near the base of the chamber $g$, covers the top of the trap $f$ and opens toward the pump, while a second check-valve, $l$, in the base of the pipe $i$, covers the top of the trap $h$, and opens toward the sea in the same direction as the valve $k$. The piston of the soil-pump is connected to the hand-lever $m$, which projects in a convenient position over the bowl or near the seat of the closet, and the piston of the water-pump $e$ is also connected with the said lever, so that when the user moves said lever both soil and water pumps will be operated at the same time. The suction end of the water-pump connects by the pipe $e'$ with any suitable source of water, either directly with the sea through the ship's side or with the peculiar form of intermediate supply-tank shown in my former patent, while the discharge end of the pump connects by the pipe $e''$ with the top of the bowl, whereby the water from the pump is thus discharged into the bowl, to cleanse the same and float off the deposits. The construction as so far described is therefore of the ordinary character, and it will be readily understood that when the pump-lever $m$ is operated water will be discharged into the bowl, while this water and other contents will be immediately afterward sucked out by the soil-pump $d$ through the trap $f$ and valve $k$, and thence discharged through the trap $h$, valve $l$, and pipe $i$ into the sea. The soil-pump is as usual of larger capacity than the water-pump, as shown, so that the contents of the bowl will be always removed with quickness and certainty.

It will be noted that when the soil-piston $n\ n'$ is fully depressed it will cover both the suction orifice of the valve-chamber $g$, leading from the bowl, and also the discharge-orifice of the trap $h$, leading to the sea, so that the piston thus acts as a valve to close the said passages of the closet when at rest, as shown and claimed in my aforesaid patent. Now, in order to make this piston act more effectively as such stop-valve, a minor feature of my invention consists in so loading the piston or its lever, either by a weight or spring, as to impart a strong constant tendency to the piston to descend and thus seat itself, and I preferably employ both a spring and a weight for this purpose—that is, I construct the piston-head of a solid mass of metal, so as to act as a heavy weight, in addition to which I employ a strong spring, $o$, of spiral or other form, connected at one end to the operating-lever $m$, or other part operatively connected with the piston, and at the other end attached to some fixed part, as indicated in the drawings, which, as will be readily understood, will fully accomplish the object aforesaid. The piston-head is preferably formed of a hollow flanged drum-shaped casting, $n$, of brass, the interior of which is filled with lead $n'''$, around the threaded stem of the piston-rod $p$, which lead is poured into the drum through holes in the top of the same, as indicated in Fig. 1. The molten lead will, of course, mold itself to the screw-threads of the stem $p$, so that the latter may be afterward readily screwed in or out when it is desired to remove or replace the parts.

The packing of the piston is of an improved character, and is as follows: The middle of the piston-head, between the flanges, is wound or packed with cotton or lamp-wick, as indicated at $n''$, or similar fibrous material—such as hemp— but cotton lamp-wicking is greatly preferable, this wicking being firmly packed between the flanges, so as to fit the cylinder tightly. Upon the top and bottom of the piston-head is placed a plate or disk, $n'\ n'$, of vulcanized rubber of a substantial thickness, as indicated, and of sufficient diameter to fit the cylinder easily, yet tightly. Washers $s\ s$ are placed over the rubber disks $n'$, the upper one of which rests under a shoulder on the piston-rod, while a nut, $r$, is screwed onto the screw-stem of the rod below the lower washer and plate, and by tightening which the different layers of the piston-head are thus held firmly together, as will be understood. This form of packing, I find, is very tight and easy-working, and, what is of great importance in a ship's closet, is very durable, and is not swelled or injured by the fluids with which it has to come in contact, whereas, ordinary cup leather packings are liable to become swelled, hardened, and deteriorated, causing leakage and stiff action, and requiring frequent repairs, which the described packing obviates.

By reference to Fig. 1 it may be noted that the several valve-seats of the closet are formed in an improved manner. The pump end of the trap $f$ as will be noted, is formed with a broad, flat-flanged base, $f'$, which is bolted to the valve-chamber $g$, while each end of the trap $h$ is formed with a similar broad flange, $h'\ h''$, one of which is bolted to the bottom of the soil-pump $d$, while the other end is bolted to the discharge-pipe $i$. The flanged top $f'$ of the trap $f$ forms the seat for the check-valve $k$, and the flange $h''$ of the trap $h$ forms the seat for the check-valve $l$, while the flanged top $h'$ will form the seat for the under side of the soil-piston when the same is depressed. The check-valves $k\ l$ are formed of leather in the usual way, as indicated in the drawings; but it will be noted that the several flanged seats are not formed plain, but are each provided with a deep annular groove, $t$, with sharp or angular edges, so that the leather flap-valves $k\ l$ or the rubber disk $n'$ on the bottom of the piston, in seating on their respective seats, will force or embed themselves against three sharp angular edges in different concentric circles—viz., the two edges of the grooves $t$ and the edge of the orifice of the traps—thereby insuring a much tighter seat, and, in case a small obstruction gets under the valve at one of the edges, it will not prevent a tight joint at the next edge, thereby rendering the seating action of the valve very effective, durable, and simple.

I connect the bowl $c$ with the trap $f$ in a manner which is an improvement over that heretofore adopted. The bowl $c$ is usually made of porcelain or crockery, over which is formed an external covering, $c'$, of sheet-lead, as indicated in Fig. 1, which is turned in over the flanged rim of the bowl, and extends down even with the edge of the neck of the bowl, as shown. Heretofore, this sheet-lead at the end of the neck has been soldered directly into the mouth of the trap $f$, so that the bowl is thus permanently connected with the trap in a manner which renders it difficult to subsequently detach the same for repairs or examination. Now, according to my improvement, I first solder to the lead-covered neck of the bowl a brass bushing, $u$, which is screw-threaded on its lower end, and I form the mouth of the trap $f$ with a similar screw-thread, into which I screw the said bushing, thus connecting the bowl with the trap in a firm tight manner, which admits of the ready removal of the parts, when required, and which is an important improvement over the former construction.

Another feature of my invention consists in the duct or tube $v$, which leads from the bilge of the ship to the soil-pump, so that the operation of the soil-pump will serve to pump out the bilge-water and thus act as the bilge-pump. This pipe $v$ preferably connects to the bottom of the trap $f$, and is provided with a cock, $v'$, which may be opened when it is desired to pump out the bilge-water, and closed at other times. In order to thus pump out the bilge-water, it will be necessary, of course, to first close the neck of the bowl $c$, for which purpose I provide a cup-shaped leather or rubber plug or piston, $w$, as seen in Fig. 3, provided with a handle, $w'$, by which it may be readily inserted in the neck of the bowl, as indicated by dotted lines in Fig. 1. When the plug $w$ is thus inserted, the valve $v'$ opened, and the piston-rod of the water-pump $e$ disconnected from the lever $m$ by removing the pin $x$, it will be obvious that when the lever $m$ is operated that the bilge-water will be drawn up into the soil-pump and thence discharged into the sea, thus relieving the ship of the bilge-water and serving to cleanse and wash out the passages of the closet at the same time, so that this simple improvement will not only form a substitute for the bilge-pump, but also acts as a cleanser of the closet.

If desired, the bilge-water pipe $v$ may open directly into the bottom of the soil-pump $d$, with its orifice covered by an independent check-valve; but the arrangement shown is obviously simpler and preferable.

An air-vent and leakage-pipe, $y$, extends from the top of the soil-pump to the top of the bowl $c$, to allow a vent of air to the top of the pump-cylinder, and, also, to conduct any leakage water which may pass the piston into the top of the cylinder back to the bowl $c$ by the up motion of the piston, as will be understood.

I am aware that it has heretofore been proposed to suspend and work weighted pistons within cylinders employed in connection with well-pumps in such manner that said pistons will have a constant tendency to descend; but I am not aware that it has been proposed to give such pistons a free as well as a constant tendency to descend, or to employ them for closing suction and discharge orifices, as above set forth and hereinafter claimed.

What I claim is—

1. In a pump water-closet, the combination, with the soil-pump cylinder having its suction and discharge orifices arranged substantially as set forth, in combination with a loaded piston fitting said cylinder, having a free and constant tendency to descend upon the base of said cylinder and rest forcibly thereon, so as to tightly close said orifices, substantially as herein set forth.

2. In a pump water-closet, the combination, with the soil-pump $d$, having its suction and discharging orifices arranged substantially as shown, of the soil-piston, acting as a valve to close the suction and discharge orifices, and a spring, $o$, acting constantly to hold said piston on its seat, substantially as herein shown and described.

3. The combination, with a pump or ship's closet, substantially such as set forth, of a tube or duct leading from the bilge or equivalent water-compartment of the ship, and connecting with the suction side of the soil-pump, substantially as and for the purpose set forth.

4. The combination, with a ship or pump closet, substantially such as set forth, of the duct or tube $v$, leading from the trap $f$, below the suction-valve $k$, to the bilge or equivalent water-space of the ship, substantially as herein shown and described.

5. The combination, with a ship or pump closet substantially such as set forth, of the plug $w$, tube $v$, and cock $v'$, arranged and operating substantially as and for the purpose set forth.

6. In a ship or pump closet, the soil-pump piston provided with the central wick or fibrous packing, $n''$, in combination with the outer heads or disks, $n'$, of rubber, substantially as and for the purpose set forth.

7. In a ship or pump closet, a valve-seat, such as $f'$, $h'$, or $h''$, formed with an annular groove, $t$, in combination with flexible or yielding valve-disks seating thereon, substantially as and for the purpose set forth.

8. In a water-closet substantially such as set forth, the combination, with the bowl formed with a metallic exterior, of the metal bushing $u$, soldered thereto and provided with a threaded neck, and the trap $f$, formed with a threaded end, to which said bushing is screwed, substantially as and for the purpose set forth.

WILLIAM BISHOP.

Witnesses:
CHAS. M. HIGGINS,
JNO. E. GAVIN.